United States Patent
Fenton et al.

[11] Patent Number: 5,934,742
[45] Date of Patent: Aug. 10, 1999

[54] PLATE TRAILER WITH LOGISTICS SLOTS

[75] Inventors: Gary L. Fenton; Gerald A. Sill, both of Edgerton, Wis.

[73] Assignee: Stoughton Trailers, Inc., Stoughton, Wis.

[21] Appl. No.: 09/183,354

[22] Filed: Oct. 30, 1998

Related U.S. Application Data

[60] Provisional application No. 60/064,426, Oct. 30, 1997.

[51] Int. Cl.$^6$ .................................................. B60P 7/08
[52] U.S. Cl. ........................... 296/181; 296/29; 296/191; 410/115; 410/101; 410/113; 410/116
[58] Field of Search ............................. 296/29, 181, 183, 296/191, 208; 410/101, 104, 105, 106, 108, 112, 113, 114, 115, 116, 144, 150

[56] References Cited

U.S. PATENT DOCUMENTS

| | | | |
|---|---|---|---|
| 3,334,007 | 8/1967 | Flagan | 161/123 |
| 3,842,755 | 10/1974 | Carr | 105/480 |
| 4,685,721 | 8/1987 | Banerjea | 296/181 |
| 4,810,027 | 3/1989 | Ehrlich | 296/181 |
| 4,904,017 | 2/1990 | Ehrlich | 296/181 |
| 4,940,279 | 7/1990 | Abott et al. | 296/181 |
| 5,066,066 | 11/1991 | Yurgevich et al. | 296/181 |
| 5,112,099 | 5/1992 | Yurgevich et al. | 296/181 |
| 5,433,501 | 7/1995 | Thomas et al. | 296/191 |
| 5,439,266 | 8/1995 | Ehrlich | 296/181 |

*Primary Examiner*—D. Glenn Dayoan
*Assistant Examiner*—Paul A. Chenevert
*Attorney, Agent, or Firm*—Michael Best & Friedrich LLP

[57] ABSTRACT

A joining member for joining an adjacent pair of plates to form a portion of a side wall of a trailer, wherein at least one of the plates includes a series of openings. The joining member includes a strip having an inner surface adjacent the plates and an outer surface opposite the inner surface, the strip including a plurality of rows of apertures, wherein each aperture extends between the inner surface and the outer surface and is adapted to receive a fastener for attaching the strip to both plates, the inner surface also including a first channel aligned to overlap both plates and a second channel aligned with the series of openings to define a series of logistics slots, and a sealing strip situated in the first channel.

13 Claims, 2 Drawing Sheets

PLATE TRAILER WITH LOGISTICS SLOTS

CROSS-REFERENCES TO RELATED APPLICATIONS

This application claims the benefit of U.S. Provisional Application No. 60/064426, filed Oct. 30, 1997.

FIELD OF THE INVENTION

The present invention relates to plate trailers constructed of a plurality of rectangular panels or plates. In particular, the invention relates to joining members for joining the plates side by side so as to form a portion of a side wall of the trailer wherein the side wall includes logistics slots accessible from the interior of the trailer.

BACKGROUND OF THE INVENTION

Because the maximum outside dimensions of plate trailers are regulated by law, it is desirable to minimize the thickness of the trailer side walls as much as possible without sacrificing structural integrity in order to maximize the interior cargo space. It is also desirable to provide the plate trailers with logistics slots or tracks on the inside surface of the side walls. The logistics slots are adapted to receive logistics fasteners or fittings for restraining the cargo of the plate trailer without diminishing the interior cargo space or reducing the inside width of the trailer.

SUMMARY OF THE INVENTION

The invention provides a trailer including a floor and a side wall extending from the floor. The side wall includes a first planar plate and a second planar plate, the first and second planar plates being aligned in co-planar relation and having respective edges aligned which are arranged in parallel, spaced relation. The plates are spaced from each other by a specified amount and one of the plates includes a plurality of vertically arranged slots extending through the plate. The side wall also includes a joining member for joining the pair of plates to form a portion of the side wall. The joining member includes an inner surface adjacent the plates and an outer surface opposite the inner surface. The joining member has three rows of apertures with each aperture extending between the outer surface and the inner surface. Each aperture is adapted to receive a fastener for attaching the joining member to the plates. The inner surface includes a first channel aligned to overlap both plates and a second channel aligned with the openings in the one plate having the openings to define a series of logistics slots. The first channel also includes a sealing strip for occupying and sealing the space between the plates.

In another embodiment, the invention provides a joining member for joining a pair of co-planar, closely spaced plates to form portion of a side wall. The joining member includes a strip having an inner surface adjacent the plates and an outer surface opposite the inner surface. The strip includes three rows of apertures. Each aperture extends between the outer surface and the inner surface and is adapted to receive a fastener for attaching the strip to the plates. The inner surface of the joining member defines a first channel which overlaps a portions of plate. The first channel also includes a sealing strip for occupying and sealing the space between the plates. The joining member also defines a second channel which is aligned with the openings in the one plate having the openings to define a series of logistics slots.

The trailer achieves advantages not provided by prior art plate trailers. For example, the side walls of the plate trailer are formed by co-planar plates and a joining member on only one side, i.e., the exterior, of the side wall. The plates and joining member cooperate to provide logistics slots opening to the interior of the trailer without requiring any members mounted on the interior face of the side wall or otherwise extending into the interior of the trailer. Thus the full dimension of the interior of the trailer can be utilized.

Also, the trailer can be configured to provide logistics slots opening into the interior of the trailer at any location. The plates forming the side walls of the trailer can be formed to define slots either adjacent and edge of the plate or spaced from the edge of the plate. A joining member can be mounted on the exterior of the plate to close the exterior face of the slot and provide a logistics slot without regard to the location of the slot relative to the edges of the plate.

Other advantages achieved by the trailer are a reduction in material, which achieves reductions in vehicle weight and cost. Also, the side walls are easier to assembly if no members on the interior of the side wall are needed to assemble the side wall.

Last, the configuration of the joining member provides structural strength to the side wall and facilitates proper positioning of the fasteners used to assemble the side wall.

Other features and advantages of the invention will become apparent to those skilled in the art upon review of the following detailed description, claims and drawings.

Figure 1:
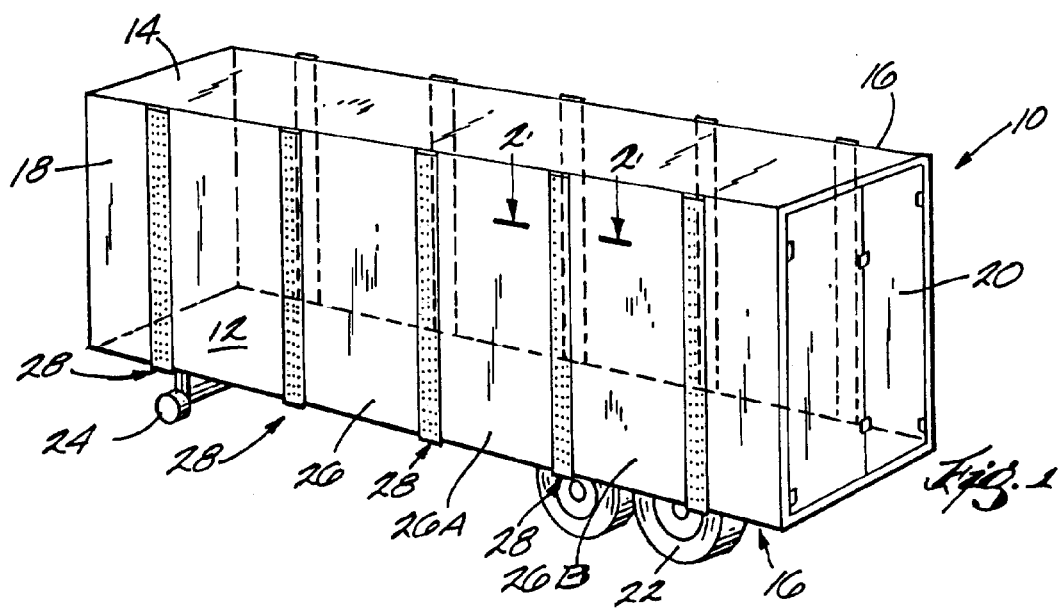
FIG. 1 is a perspective view of a plate trailer embodying the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

The drawings illustrate a plate trailer 10 which embodies the invention. Referring to FIG. 1, the plate trailer 10 includes a floor 12, a roof 14, a pair of opposed side walls 16 extending up from the floor 12 to the roof 14, a front wall 18 closing the floor 12, roof 14 and side walls 16 at one end of the trailer 10. The trailer 10 also includes a loading door 20 closing the end of the trailer 10 opposite the front wall 18. The trailer 10 also includes several wheels 22 which support the back end of the trailer 10, and landing gear 24 supports the front end of the trailer 10 when it is not attached to a tractor.

Each side wall 16 is constructed of a plurality of generally planar, rectangular plates 26, preferably made of a lightweight metallic material such as aluminum or the like. The plates 26 each include generally straight edges 30 and opposed faces respectively facing into the interior of the trailer 10 and facing outwardly of the trailer 10. For reasons explained in more detail below, the plates 26 have extending therethrough a plurality of fastener holes which are arranged in linear patterns along the vertical edges of the panels. In addition, selected panels 26 have extending therethrough a plurality of slots which are also arranged in generally linear patterns extending vertically between the floor 12 and roof 14.

Figure 2:
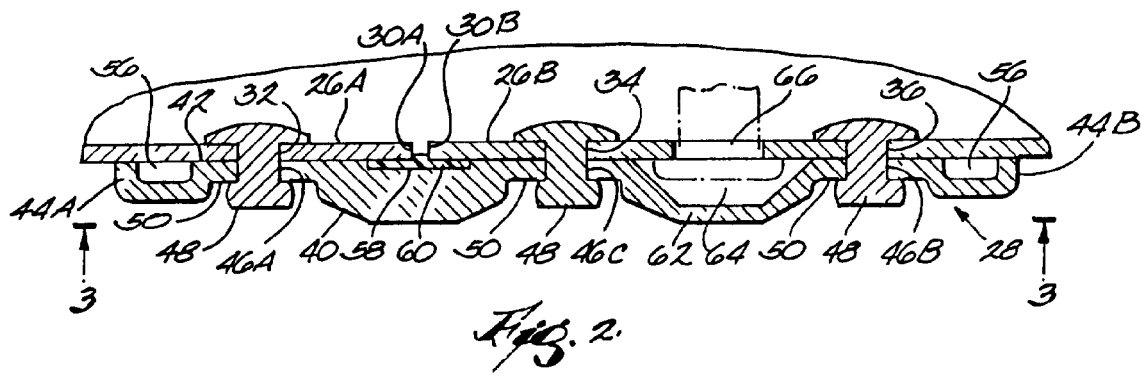
FIG. 2 is a sectional view taken along line 2—2 of FIG.1 illustrating a portion of the plate trailer in cross-section.
Figure 3:
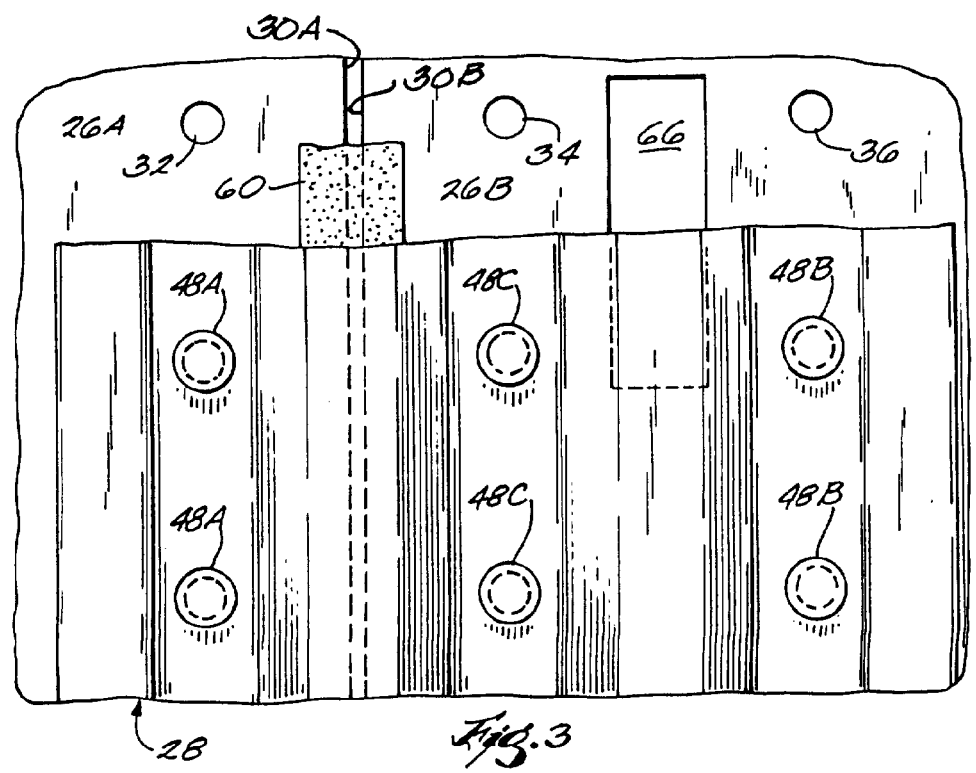
FIG. 3 is a view from the outside of the trailer illustrating a joining member used to join two plates, with a portion cut away.

FIGS. 2 and 3 illustrate in greater detail two adjacent plates 26A, 26B that are connected by the joining member 28 to form a portion of a side wall 16. The plates 26A and 26B are aligned in co-planar relation and so that respective edges 30A, 30B are parallel and not touching but are spaced apart by a clearance. Plate 26A includes a first plurality of apertures 32, each of which communicates between the inner and outer faces of the plate 26A. The apertures 32 are arranged in a linear pattern along the vertical edge 30A of plate 26A. The apertures 32 are sized and arranged for receiving a respective fastener 48.

Plate 26B includes a second plurality of apertures 34, and a third plurality of apertures 36. The apertures 34 and 36 are similar to the apertures 32 and also are for receiving fasteners 48. The apertures 34 extend along the edge 30B of plate 26B in a generally straight line. Similarly, the apertures 36 extending parallel to the edge 30B in a straight line, but are located way from the edge 30B. Plate 26B also includes a plurality of generally rectangular openings or logistics slots 66 located between the arrays of apertures 34, 36. While the apertures 32, 34, 36 and logistics slots 66 are shown in FIGS. 2 and 3 as being located adjacent an edge 30 of a panel 30, it will be readily understood after reviewing this disclosure that these openings 32, 34, 36 and 66 in the panels 26 may be located in spaced relation to the edges 30 so that logistics slots can be formed at any location along the side walls 16 of the trailer 10.

The trailer 10 also includes a plurality of joining members 28 for interconnecting adjacent plates 26 to form sections of the side walls 16. Each joining member 28 is generally in the form of an elongated strip having opposite ends; one of which is located adjacent the floor 12 and one of which is located adjacent the roof 14 when the joining member 28 is assembled as a component of the side wall 16. The joining member 28 is sufficiently long, therefore, to extend the entire length of the adjacent plate edges 30 (from approximately the roof 14 to the floor 12 of the trailer 10). The joining member 28 also has opposite edges extending between the opposite ends; one is a leading edge (44A) and the other is a trailing edge (44B right). The joining members 28 are also preferably extruded lightweight metallic material such as aluminum or the like.

The joining member 28 is mounted on only one face of the plates 26A and 26B, particularly the face that will be the exterior face of the side wall 16. The joining member 28 includes an inner surface 42 that faces the plates 26A, 26B, and an opposite, outer surface 40. The joining member 28 also includes three rows of apertures 46; one row 46A extending along the leading edge of the joining member 28, a second row 46B extending along the trailing edge of the joining member 28, and an intermediate row 46C located intermediate the rows 46A and 46B.

Each of the apertures 46 communicate between the outer surface 40 and the inner surface 42 of the joining member 28, and are arranged to register or align with a respective aperture in the rows 32, 34 and 36 of apertures in the panels 26. A plurality of fasteners 48 are provided in the apertures 46 of the joining member 28 and extend through the respective plates 26A, 26B.

Adjacent the leading and trailing edges of the joining member are respective outer channels 56 which open toward the respective plate on which the edges of the joining member are mounted. The channels 56 are formed (FIG. 2) by a unshaped rib that extends the entire length of the joining member 28. The outside channels 56 provide structural strength to the joining member 28 and, therefore, to the side wall 16. Also, the channels 56 respectively provide a vertically extending cavity extending inwardly from the leading and trailing edges of the joining member. In the event any moisture enters the interface between the joining member 28 and panels 26 along either the leading or trailing edge, the channels 56 direct such moisture downwardly to the ground. In this manner, excess moisture is prevented from reaching the fasteners 48 or the interior of the trailer 10.

The joining member 28 also includes a central portion that is situated between the row 46A of apertures and the row of fasteners 46C. The central portion is generally solid and extends outwardly from the side wall 16. The central portion and the rib extending along the leading edge of the joining member cooperate to form an outwardly facing channel or depressions 50 that is sufficiently deep so that the ends of the fasteners 48 on the outside of the side wall 16 do not extend beyond the outer surface of the central portion of the joining member 28.

The inner face of the central portion defines a seal channel 58 extending between the ends of the joining member and, in the illustrated embodiment, overlapping the clearance between the edges 30A and 30B of the panels 26. The seal channel has a generally rectangular cross section when viewed perpendicular to the length of the seal channel. However, as will be understood, the seal channel may be configured to appropriately extend across the clearance between the panels and retain a seal member.

In the illustrated embodiment, the seal channel retains sealing strip 60 which is made of a flexible resilient material, preferably neoprene, and which has a thickness slightly greater than the depth of the seal channel. The sealing strip is compressed between the inner surface 42 of the joining member 28 and the plates 26A, 26B. Similar sealing strips (not shown) can also be situated between the joining member 28 and the plates 26A, 26B along the three rows of fasteners 48 to further prevent moisture from reaching the inside of the trailer 10.

Situated between the middle row of fasteners 48C and the row of fasteners 48C along the trailing edge of the joining member 28 is an offset portion 62. The offset portion 62 defines a receiving channel 64 which is aligned adjacent the logistics slots 66 of plate 26B. The width of the receiving channel 64 is somewhat greater than the width of the logistics slots 66. The logistics slots 66 are adapted to receive logistics fasteners and fittings to restrain the cargo of the trailer 10.

The trailer 10 thus provides a plate trailer having side walls 16 formed by co-planar plates 26 and a joining member 28 on only one side of the plates 26, i.e., the exterior, of the side wall 16. The panels 26 and the joining member 28 cooperate to provide logistics slots 66 opening to the interior of the trailer 10 without requiring any members mounted on the interior face of the side wall 16 or otherwise requiring projections extending into the interior of the trailer 10. Thus the full dimension of the interior, i.e., the distance between the inner faces of the panels 26 forming the side walls 16 of the trailer 10 can be utilized.

Also, the trailer 10 can be configured to provide logistics slots 66 opening into the interior of the trailer 10 at any location along the side wall 16. The plates 26 forming the side walls 16 of the trailer 10 can be formed to provide slots 38 either adjacent an edge 30 of the panel 26 or spaced from the edge 30 of the panel 26. When so located, a joining member 28 can be mounted simply on the exterior of the plate 26 so that the receiving channel 64 is situated over the exterior face of the slot 38 to close the logistics slot 66 without regard to the location of the slot 66 relative to the edges 30 of the plate 26. In such an arrangement, the joining member 28 need not include a seal strip 60.

Various other features of the invention are set forth in the following claims.

What is claimed is:

1. A joining member for joining an adjacent pair of plates to form a portion of a side wall of a trailer, wherein at least one of the plates includes a series of openings, the joining member comprising:

a strip having an inner surface for positioning adjacent the plates and an outer surface opposite the inner surface, said strip including a plurality of rows of apertures, wherein each aperture extends between the inner surface and the outer surface and is adapted to receive a fastener for attaching the strip to both plates, the inner surface also including a first channel aligned to overlap both plates and a second channel aligned with the series of openings to define a series of logistics slots, and a sealing strip situated in the first channel.

2. The joining member of claim 1 wherein the first channel is of uniform depth.

3. The joining member of claim 2 wherein the thickness of the sealing strip is greater than the depth of the first channel.

4. The joining member of claim 1 wherein the strip includes ends and the inside surface of the strip further includes outside channels situated near the ends of the strip.

5. The joining member of claim 1 wherein the outer surface of the strip includes depressions around the apertures.

6. The joining member of claim 1 wherein one of said plurality of row of apertures is located between the first channel and the second channel.

7. A joining member for joining an adjacent pair of plates to form a portion of a side wall of a trailer, said plates being spaced from each other by a specified amount and wherein at least one of the plates includes a series of vertically arranged openings, the joining member comprising:

a strip having an inner surface for positioning adjacent the plates and an outer surface opposite the inner surface, said strip including three rows of apertures, wherein each aperture extends between the outer surface and the inner surface and is adapted to receive a fastener for attaching the strip to the plates, the inner surface also including a first channel aligned to overlap both plates and a second channel aligned with the openings to define a series of vertically arranged logistics slots, and a sealing strip situated in the first channel.

8. The joining member of claim 7 wherein the first channel is of uniform depth.

9. The joining member of claim 8 wherein the thickness of the sealing strip is greater than the depth of the first channel.

10. The joining member of claim 7 wherein the strip includes ends and the inside surface of the strip further includes outside channels situated near the ends of the strip.

11. The joining member of claim 7 wherein the outer surface of the strip includes depressions around the apertures.

12. The joining member of claim 7 wherein the middle row of apertures is located between the first channel and the second channel.

13. A plate trailer comprising a floor, a side wall extending from the floor and including a first planar plate and a second planar plate, the first and second planar plates being aligned in coplanar relation and having respective edges aligned in parallel, spaced relation; and a joining member for joining the first and second plates, the joining member including a strip having an inner surface adjacent the plates and an outer surface opposite the inner surface, the strip including a plurality of rows of apertures, wherein each aperture extends between the inner surface and the outer surface and is adapted to receive a fastener for attaching the strip to both plates, the inner surface also including a first channel aligned to overlap both plates and a second channel aligned with a series of openings to define a series of logistics slots, and a sealing strip situated in the first channel.

\* \* \* \* \*